C. DANCEL & E. C. SMITH.
Machinery for Splitting and Beveling Leather.
No. 9,680. Reissued April 19, 1881.
Fig. 1.
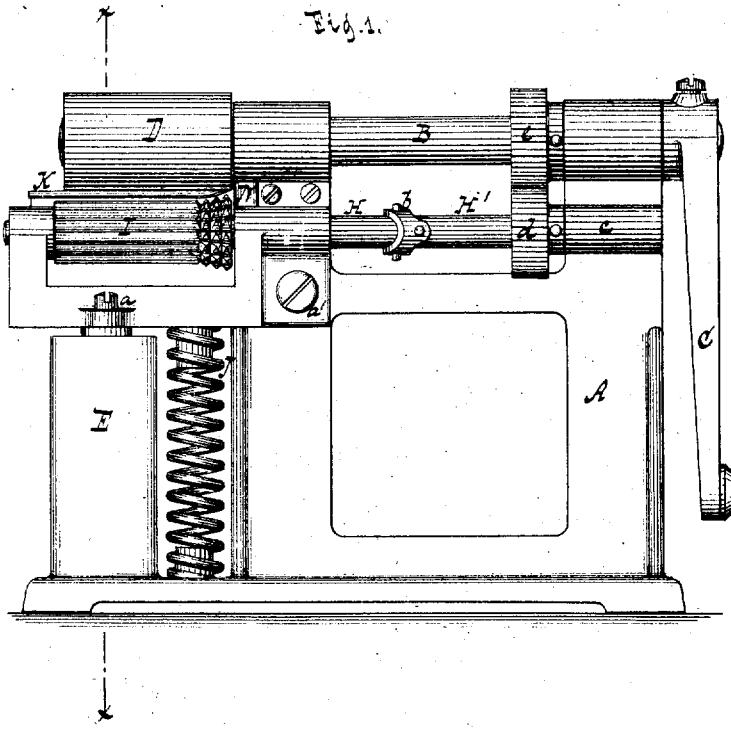
Fig. 3.
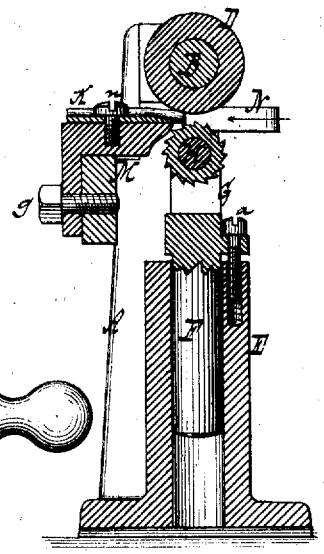
Fig. 2.
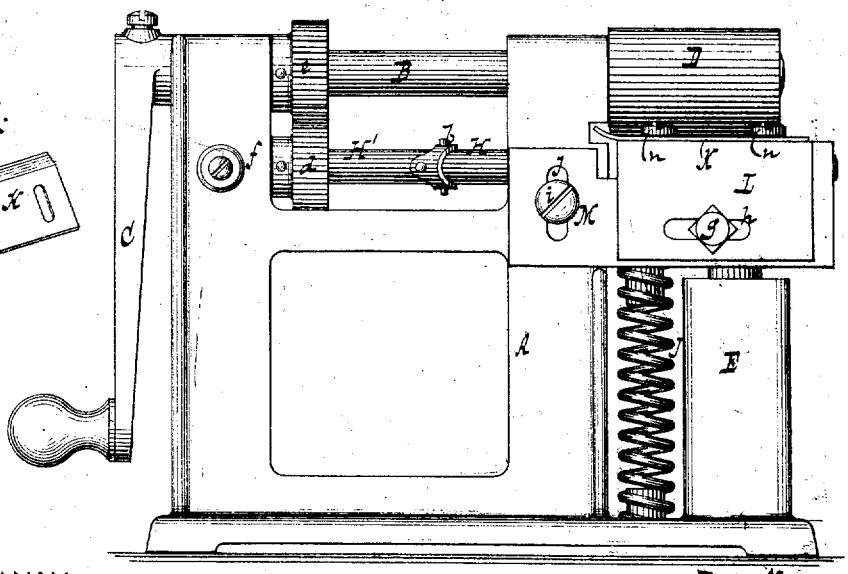
Fig. 7.
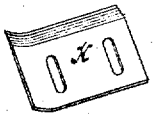
Fig. 5.
Fig. 6.
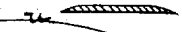
Fig. 4.
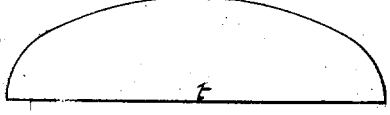
Witnesses
Geo. Duffland
William Miller
Inventors.
Christian Dancel
Edmond C. Smith.
by
Van Santvoord & Hauff
their attorneys

UNITED STATES PATENT OFFICE.

CHRISTIAN DANCEL, OF NEW YORK, N. Y., AND EDMOND C. SMITH, OF WESTPORT, CONN.

MACHINERY FOR SPLITTING AND BEVELING LEATHER.

SPECIFICATION forming part of Reissued Letters Patent No. 9,680, dated April 19, 1881.

Original No. 196,197, dated October 16, 1877; Reissue No. 9,235, dated June 8, 1880. Application for reissue filed March 21, 1881.

*To all whom it may concern:*

Be it known that we, CHRISTIAN DANCEL, a citizen of the United States, residing at New York, in the county and State of New York, and EDMOND C. SMITH, a citizen of the United States, residing at Westport, in the county of Fairfield and State of Connecticut, have invented a new and useful Improvement in Machines for Splitting and Beveling Leather, of which the following is a specification.

The object of this invention is to obtain a facile means for splitting and beveling leather or other material in one operation; and it consists in the combination of an edge-gage, a knife having a longitudinal cutting-edge curved upward at the end adjacent to the edge-gage, and a feed-roller; also, in the combination of a knife having a longitudinal cutting-edge curved upward at one end, and a feed-roller enlarged in diameter at one end to conform substantially to the shape of the knife, whereby leather or other material may be simultaneously split and beveled at one end, as hereinafter set forth; also, in the combination of a gage-roller, a feed-roller, an edge-gage, and a knife the cutting edge of which is curved upward at one end, so that a piece of leather or other material, in being passed through between the gage-roller and the feed-roller, is split and beveled in one operation. The diameter of the feed-roller increases at one end to correspond to the curvature of the cutting-edge of the knife, so that the same will take hold of and feed the material when being passed through the machine for the second time and after it has already been split by the first operation. The knife is so arranged that it can be adjusted toward and from the gage-roller, and also in the direction of the length of this roller; and its cutting-edge is made longer than the feed-roller, so that when it is adjusted in the direction of the length of the gage-roller its cutting-edge will always act throughout the entire length of the feed-roller. The feed-roller is mounted in a head which is adjustable toward and from the knife and the gage-roller, and its shaft is made in two sections, which are connected by a universal joint, so that said shaft will remain in gear with the driving-shaft, and the feed-roller, when being moved up or down, will remain parallel with the gage-roller.

This invention is illustrated in the accompanying drawings, in which Figure 1 represents an elevation showing one side of our machine. Fig. 2 is a similar view, showing the other side. Fig. 3 is a transverse vertical section in the plane *x x*, Fig. 1. Fig. 4 is a plan view of the blank for the counter for a boot or shoe. Fig. 5 is a section of the blank after the same has been passed once through our machine. Fig. 6 is a similar view when the blank is finished. Fig. 7 shows the knife detached.

Similar letters indicate corresponding parts.

In the drawings, the letter A designates the frame of our machine, which forms the bearings for the driving-shaft B. On one end of this driving-shaft is mounted a handle or winch, C, and on its other end is firmly secured a smooth roller, D, which we term the "gage-roller."

From the bed-plate of the frame A rises a hollow column, E, which forms the guide for the shank F of a head, G. This head forms the bearings for the shaft H of the feed-roller I, and it is exposed to the action of a spring, J, which has a tendency to force the feed-roller up toward the gage-roller. A set-screw, *a*, Figs. 1 and 3, prevents the feed-roller from rising beyond the desired point, and it serves to adjust the distance between the feed-roller and the gage-roller.

The shaft H of the feed-roller is connected, by a universal joint, *b*, to a shaft, H′, which has its bearing in a box, *c*, and which is geared together with the driving-shaft B by cog-wheels *d e*. The box *c* is secured to the frame A by a single screw-pivot, *f*, Fig. 2, so that it can turn thereon. The feed-roller, in being raised or lowered, must preserve its parallelism with the gage-roller, since its supporting-head G is guided in the vertical column E; but as the feed-roller is raised or lowered its shaft H is thrown out of line with the shaft H′, and for this reason the universal joint *b* and the swivel-box *c* have to be applied. A screw, *a′*, which extends through a slot in the head G and screws into the frame A, assists in preserving the parallelism of the feed-roller.

On the side of the frame A opposite to that of the feed-roller is situated the knife K, which is secured to a support, L, by set-screws *n*, or other similar fastenings, so that the knife is removable from its support, and it is made practicable to replace the same by a new one whenever it becomes worn out or broken. (See Figs. 2 and 3.) This support rests upon a bracket, M, and is held in position by a set-screw, *g*, which extends through a slot, *h*, Fig. 2, so that the knife can be adjusted in the direction of the length of the gage-roller. The bracket M is secured to the frame A by a set-screw, *i*, which extends through a slot, *j*, Fig. 2, so that the knife can be raised or lowered.

The cutting-edge of the knife is curved upward at its inner end, (see Figs. 1, 2, and 7,) and the diameter of the feed-roller is increased at its inner end to correspond to the curvature of the cutting-edge of the knife. The cutting-edge of the knife is made longer than the feed-roller, so that when the knife is adjusted in the direction of the length of the gage-roller its outer end will always extend beyond the outer end of the feed-roller.

Close to the inner curved end of the knife is situated the edge-gage N, which assists in guiding the material during the operation of splitting and beveling. The feed-roller is provided with teeth throughout its whole length, so that the same takes a firm hold of the material to be operated upon.

After the feed-roller has been adjusted at the desired distance from the gage-roller corresponding to the original thickness of the material to be acted upon, the knife is set at a distance from the gage-roller corresponding to the thickness which the material is to have after it has been split, and then the knife is adjusted in the direction of the length of the gage-roller, so that its curved edge coincides with the corner formed between the edge gage and the bottom line of the gage-roller. The leather or other material, which is first cut up into blanks of the desired shape—such, for instance, as counters or boxes for boots and shoes, (see Fig. 4,)—is then inserted between the feed-roller and gage-roller, one edge of the blank being held up against the edge-gage, and by turning the handle C the blank is subjected to the action of the knife K, whereby it is split to the desired thickness, while its inner edge is at the same time beveled off (see Fig. 5) without leaving a deficient ridge upon the surface of the blank, as is the case in the machines using a straight knife or cutter. The knife with its cutting-edge curved upward at one end, thus forms an important feature of our invention. After the blank has thus been split and beveled at one edge its opposite edge is brought against the edge-gage, and by passing the blank through the machine the second time this inner edge is also beveled off to the desired shape. (See Fig. 6.) It will be readily seen that this second operation could not be performed practically if the feed-roller were made of uniform thickness throughout its entire length, since the blank is split by the first operation, so that the parallel portion of the feed-roller would not readily feed it a second time. During the second operation the blank is fed by the action of the increased inner end of the feed-roller.

The form of the edge-gage must be changed for blanks of different shapes.

Our machine is designed particularly for splitting and beveling counters and boxes for boots and shoes; but it can be used for blanks of any other description made of leather, pasteboard, or other materials of a similar nature.

We are aware of machines embodying a knife the cutting-edge of which is curved at one end; but in such machines the edge-gage is adjacent to that end of the knife which is opposite to its curved end, and it will be readily seen that those machines can be used for splitting and beveling such blanks or pieces of leather only which have parallel edges, but a blank with a curved edge, such as is employed for the counters and boxes of boots and shoes cannot thereby be split and beveled.

In our machine both the rectilinear edge and the curved edge of such blanks can be beveled with equal facility. In Fig. 4 of the drawings we have shown a blank for the counter of a boot or shoe, and in order to split and bevel such a blank we pass it through our machine, first by holding its straight edge *t* up against the edge-gage, and then again by holding its curved edge *u* up against the edge-gage.

What we claim as new, and desire to secure by Letters Patent, is—

1. In a machine for splitting and beveling leather or other material, the combination, substantially as hereinbefore set forth, of the edge-gage, the knife having a longitudinal cutting-edge curved upward at the end adjacent to the edge-gage, and the feed-roller.

2. In a machine for splitting leather or other material, the combination of a knife having a longitudinal cutting-edge curved upward at one end, and a feed-roller enlarged in diameter at one end to conform substantially to the shape of the knife, whereby leather or other material may be simultaneously split and beveled at one edge, as hereinbefore set forth.

3. The combination of the upper plain gage-roller, D, the lower vertically-moving corrugated feed-roller I, enlarged at its rear end, the edge-gage N, at the inner end of the gage-roller, and the laterally and longitudinally adjustable knife K, having its cutting-edge curved upward to correspond to the enlarged end of the feed-roller, substantially as and for the object set forth.

4. The combination of the upper plain gage roller, D, the longitudinal knife K, and the vertically-adjustable corrugated feed-roller I, enlarged at its rear end, substantially as and for the object set forth.

5. The combination, with a gage-roller and with a knife the cutting-edge of which is curved upward at one end, of a corrugated vertically-moving feed-roller, the diameter of which increases toward one end to correspond to the curved edge of the knife, substantially as and for the purpose described.

6. The combination, with the gage-roller D, the feed-roller I, head G, and driving-shaft B, of two shafts, H H′, connected by a universal joint, *b*, and a swivel-box, *c*, all constructed and adapted to operate, substantially as set forth.

In testimony that we claim the foregoing we have hereunto set our hands and seals this 11th day of March, 1881.

CHRISTIAN DANCEL. [L. S.]
EDMOND C. SMITH. [L. S.]

Witnesses:
J. HERMANN WAHLERS,
WILLIAM MILLER.